(12) United States Patent
Clute

(10) Patent No.: US 7,401,815 B2
(45) Date of Patent: Jul. 22, 2008

(54) DUAL SPOOL RETRACTOR SEAT BELT SYSTEM

(75) Inventor: Gunter K. Clute, Bloomfield Hills, MI (US)

(73) Assignee: Antoliv ASP, Inc., Ogden, UT (US)

( * ) Notice: Subject to any disclaimer, the term of this patent is extended or adjusted under 35 U.S.C. 154(b) by 325 days.

(21) Appl. No.: 11/082,567

(22) Filed: Mar. 17, 2005

(65) Prior Publication Data

US 2006/0208124 A1    Sep. 21, 2006

(51) Int. Cl.
*B60R 22/008* (2006.01)
(52) U.S. Cl. ............ 280/803; 180/268; 242/374
(58) Field of Classification Search .......... 280/803; 180/268; 242/374
See application file for complete search history.

(56) References Cited

U.S. PATENT DOCUMENTS

| | | | | |
|---|---|---|---|---|
| 4,138,142 A * | 2/1979 | Wize | ............ | 280/803 |
| 4,164,336 A * | 8/1979 | Higbee et al. | ............ | 242/378.4 |
| 4,307,853 A * | 12/1981 | Higbee et al. | ............ | 242/385.2 |
| 4,327,882 A * | 5/1982 | Frankila et al. | ............ | 242/378.4 |
| 4,343,445 A * | 8/1982 | Ocker et al. | ............ | 242/378.4 |
| 4,434,953 A * | 3/1984 | Gemar et al. | ............ | 242/374 |
| 4,498,642 A * | 2/1985 | Doty | ............ | 242/378.4 |
| 4,518,130 A * | 5/1985 | Gloomis | ............ | 242/378.4 |
| 5,054,814 A * | 10/1991 | Hirasawa et al. | ............ | 280/803 |
| 5,211,352 A * | 5/1993 | Meyer et al. | ............ | 242/372 |
| 5,397,075 A * | 3/1995 | Behr | ............ | 242/374 |
| 5,443,222 A * | 8/1995 | Modinger et al. | ............ | 242/374 |
| 5,881,962 A * | 3/1999 | Schmidt et al. | ............ | 242/374 |
| 6,336,657 B1 * | 1/2002 | Akaba et al. | ............ | 280/733 |
| 6,345,504 B1 * | 2/2002 | Takehara et al. | ............ | 60/638 |
| 6,363,722 B1 * | 4/2002 | Takehara et al. | ............ | 60/632 |
| 6,406,059 B1 * | 6/2002 | Taubenberger et al. | ...... | 280/733 |
| 6,419,176 B1 * | 7/2002 | Mizuno | ............ | 242/374 |
| 6,612,514 B1 * | 9/2003 | Schmidt | ............ | 242/374 |
| 6,623,037 B2 * | 9/2003 | Ritters et al. | ............ | 280/801.1 |
| 6,669,131 B2 * | 12/2003 | Takehara et al. | ............ | 242/374 |
| 6,715,792 B2 * | 4/2004 | Yamachi et al. | ............ | 280/801.2 |
| 6,722,600 B2 * | 4/2004 | Hamaue et al. | ............ | 242/374 |
| 7,089,739 B2 * | 8/2006 | Kameda et al. | ............ | 60/632 |
| 7,124,974 B2 * | 10/2006 | Shiotani et al. | ............ | 242/374 |
| 2001/0040199 A1 * | 11/2001 | Takehara et al. | ............ | 242/374 |
| 2002/0000487 A1 * | 1/2002 | Hamaue et al. | ............ | 242/374 |
| 2003/0001041 A1 * | 1/2003 | Yoon | ............ | 242/382.6 |
| 2003/0122020 A1 * | 7/2003 | Tanji | ............ | 242/374 |

(Continued)

FOREIGN PATENT DOCUMENTS

DE        199 15 275        10/2000

(Continued)

*Primary Examiner*—Kevin Hurley
*Assistant Examiner*—Timothy Wilhelm
(74) *Attorney, Agent, or Firm*—Sally J Brown; Brinks Hofer Glison & Lione

(57) ABSTRACT

A dual spool retractor for a motor vehicle seat belt system. The dual spool retractor includes shoulder belt and lap belt spool assemblies engaging with the shoulder belt and lap belt portions of the seat belt webbing. The dual spool retractor incorporates a gas driven pretensioner system incorporating a common gas generator connection for both the shoulder belt spool assembly and the lap belt spool assembly. Both spool assemblies are caused to undergo pretensioning retraction energized by a single gas generator.

14 Claims, 12 Drawing Sheets

U.S. PATENT DOCUMENTS

2003/0213864 A9*  11/2003  Hamaue et al. ............. 242/374
2004/0169104 A9*   9/2004  Shiotani et al. ............. 242/374
2005/0161135 A1*   7/2005  Williams et al. ............. 149/45
2005/0178870 A1*   8/2005  Loffler et al. ............. 242/374
2005/0211816 A1*   9/2005  Takamatsu et al. .......... 242/374
2006/0243843 A1*  11/2006  Clute ......................... 242/374
2007/0024045 A1*   2/2007  Zelmer et al. .............. 280/806

FOREIGN PATENT DOCUMENTS

EP          1 128 933          6/2002

* cited by examiner

DUAL SPOOL RETRACTOR SEAT BELT SYSTEM

FIELD OF THE INVENTION

This invention relates to automotive safety restraint systems and, in particular, to an active three-point belt system having dual seat belt retractor spools mounted to a common frame.

BACKGROUND OF THE INVENTION

Numerous designs of passive and active automotive occupant restraint systems are known for enhancing occupant protection in the event of a vehicle impact. Passive systems such as inflatable restraints or air bags for frontal and side impacts and automatically deployed seat belt systems are known. Active seat belt systems have been used for many decades and are manually deployed by the occupant. The conventional seat belt system uses three points of connection with the vehicle structure and incorporates a lap belt section for engaging the occupant's lower torso, and a shoulder belt section for engaging the occupant's upper torso. When used, the seat belt restrains movement of the occupant in the event of a vehicle impact or rollover event. In order to enhance the comfort and convenience provided by the seat belt system, retractors are used which permit the belt webbing to be extracted from and retracted into the retractor, allowing movement of the occupant while maintaining the belt in close contact with the occupant. An inertia sensitive vehicle sensor which may be used with a webbing sensor, locks the retractor when an impact or rollover event is detected, preventing further extraction of webbing to restrain the occupant.

A more recent development in the area of seat belt systems is that of the so-called inflatable seat belt. An inflatable seat belt system incorporates a section of the shoulder belt which is inflated by a gas, typically by a pyrotechnic inflator, to increase its size and volume. Thus, when an inflatable seat belt is deployed, the normally narrow seat belt webbing expands significantly to reduce the contact pressure between the shoulder belt and the occupant during an impact event. Inflatable seat belts also act as a belt pretensioner by reducing belt slack. Inflatable seat belts are typically deployed using the crash sensing systems also used to deploy other inflatable restraint systems upon the detection of a vehicle impact or rollover event having predetermined dynamic characteristics.

Various approaches have been proposed to properly position the inflatable seat belt section with respect to the occupant's upper torso. One approach utilizes a pair of seat belt retractors, one having a spool for winding and storing the lap belt portion of the webbing, and a second retractor for winding and stowing the shoulder belt portion of the webbing. In addition to applications involving inflatable seat belt sections, dual retractor systems are also incorporated in certain vehicles to provide enhanced comfort and convenience for the vehicle occupants, and provides them with greater freedom of movement. This is particularly appropriate in luxury vehicles where the additional costs for the benefits of a dual retractor system are acceptable.

Providing dual retractors for the seat occupants increases the cost and complexity of the restraint system. Further compounding the cost duplication of a dual retractor system is the emergence of an increasing number of sophisticated control systems for retractors. An example of such a control system is a retractor pretensioner. Retractor pretensioners cinch the seat belt webbing against the occupant, eliminating slack immediately upon the detection of a vehicle impact. Reducing the slack in the seat belt system enables the occupant's forward motion to quickly engage the seat belt to begin dissipating impact energy. Various designs of pretensioners are presently known, including a type known as a Roto-Pretensioner which incorporates a series of balls in a gas duct which are driven by the deployment of a micro gas generator to engage with and wind the retractor spool sprocket to retract the webbing.

Another retractor control device presently considered are so-called pre-pretensioners. These devices begin to cinch the seat belt webbing against the occupant even before an actual impact is detected. This can be provided using, for example, radar, ultrasonic, or other sensing systems which anticipate a vehicle crash event before actual impact has occurred. Electronically controlled retractors are also being developed in which the locking function is controlled by a solenoid, as opposed to the more prevalent inertia sensitive rolling ball or pendulum type locking devices. Other electronic controlled designs of these devices are also available involving the use electrodynamic devices to cause locking or even actively winding the seat belt retractors as desired. The implementation of these retractor control systems further increases the cost of providing such features in a dual retractor system, since these functions may be duplicated for each retractor.

BRIEF SUMMARY OF THE INVENTION

The dual spool retractor restraint system in accordance with the present invention provides advantages over the shortcomings of the prior art as previously described. These advantages are provided by incorporating a single retractor spool control mechanism capable of being coupled to both spools of a dual spool retractor system. A belt pretensioner is one example of a spool control mechanism. In one series of embodiments illustrated and described herein, a single gas source is coupled to a pair of tube assemblies which form part of pretensioner assemblies for both the upper spool and the lower spool. This achieves economies by avoiding the necessity of duplicating the gas sources and the associated wiring and mounting hardware. In this way, a single pretensioning control signal and firing loop may be used to fire the gas source to cause pretensioning of both spools simultaneously. In this device, both spools are mounted to a single retractor frame which is mounted to a structural member of the motor vehicle and, for example, could be mounted to the vehicle's "B" pillar.

Additional embodiments of the dual spool retractor system of this invention are described. Such additional embodiments illustrate various means of implementing a Roto-Pretensioner system in a dual spool retractor configuration. Alternate types of pretensioner systems may also be used which simultaneously provide pretensioning of both spools. For example, a piston and cylinder cable type pretensioner may be provided. In such designs, a cable attached to a piston wraps around a sector connected with both spools to cause them to undergo pretensioning rotation as the piston is driven within a cylinder under the influence of a gas source. In addition, various types of rack and pinion type pretensioners can be provided in which a toothed rack engaging a pinion gear on each sprocket rotates the sprocket when the rack is stroked. Such stroking can be accomplished by numerous means including piston and cylinder gas actuated types or other actuators. The rack and pinion design may be implemented in various manners to provide rotation of both spools in the same rotational direction or in opposite directions and some designs provide redundancy, enabling pretensioning of one spool to occur even in the event that the other spool is locked or otherwise resists pretensioning retraction.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
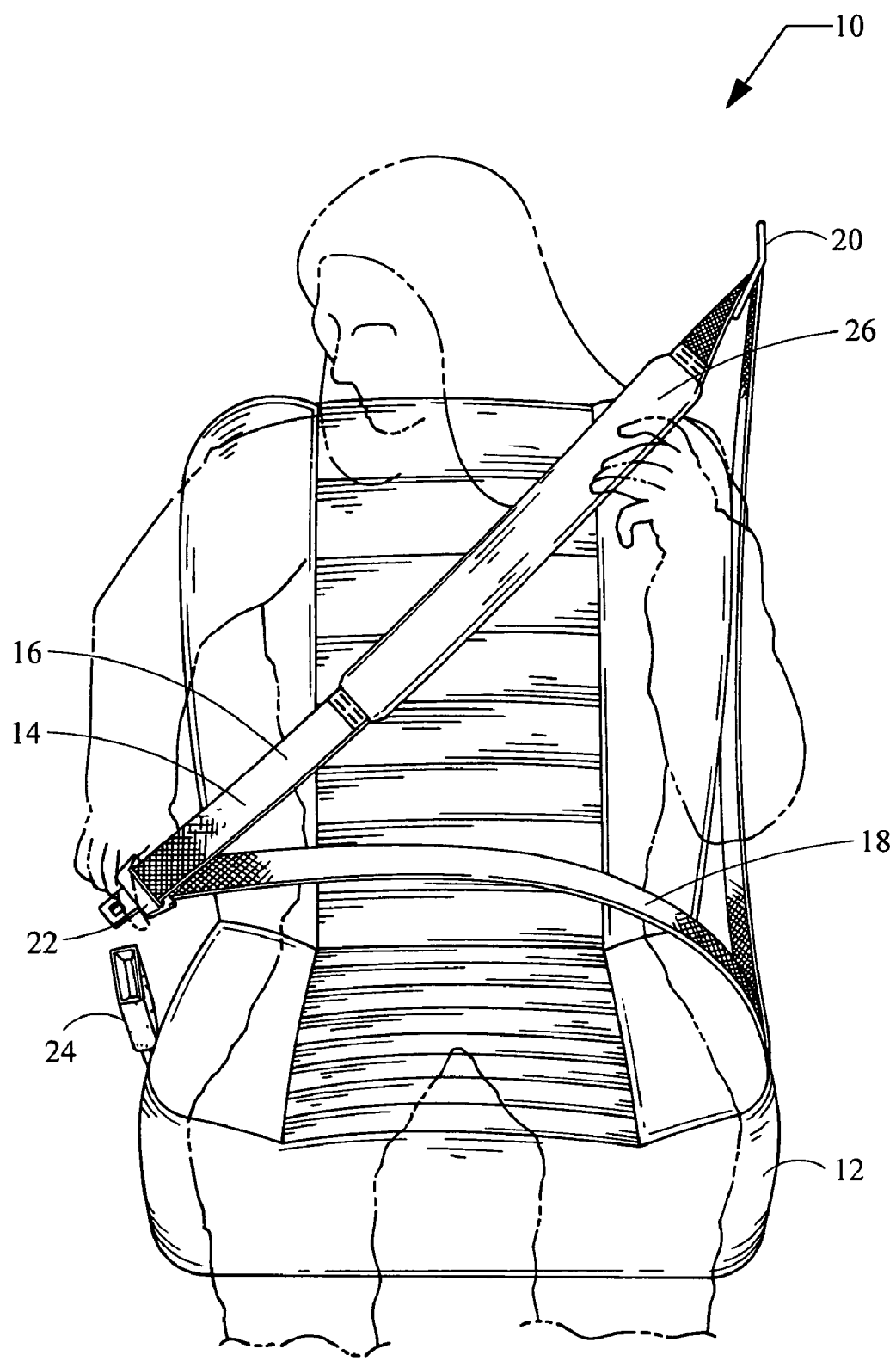
FIG. 1 is a diagrammatic view of a motor vehicle occupant using a three-point manual belt system incorporating an inflatable belt portion which may be used with the dual spool retractor assembly of the present invention.

With reference to the figures, seat belt system 10 is shown installed for protecting an occupant seated in vehicle seat 12. Seat belt system 10 principally comprises webbing 14 which is divided into an upper webbing portion forming the shoulder belt 16, and a lower webbing portion forming a lap belt 18. The shoulder belt 16 passes around a "D" ring 20 which is typically mounted to the "B" pillar of the motor vehicle (the vertical structural member separating the front and rear doors of a four-door vehicle). Seat belt tongue 22 is attached to the seat belt webbing 14 and is received by seat buckle 24 which is typically mounted to the vehicle floor pan or the seat cushion frame. Since system 10 utilizes a dual spool retractor, seat belt tongue 22 is fixed to the ends of shoulder belt 16 and lap belt 18 (single spool retractor systems require a sliding tongue).

In the embodiment illustrated in FIG. 1, shoulder belt 16 further includes an inflatable belt section 26. Inflatable belt section 26 is in communication with a gas source 25 (shown in FIG. 2) causing that portion of the shoulder belt to rapidly expand in cross-section upon the detection of a vehicle impact. This inflation reduces the contact pressure between the shoulder belt 16 and the occupant in the event of a frontal impact, and further acts to pretension the belt system. Since the inflatable belt section 26 must be properly positioned on the occupant, a dual spool retractor system of this invention is particularly suited for use with such designs. It is noted that dual spool retractor systems in accordance with this invention are not necessarily implemented in connection with restraint systems incorporating an inflatable belt section 26. Instead, any seat belt system incorporating a dual spool retractor may benefit from the features of the present invention.

Figure 2:
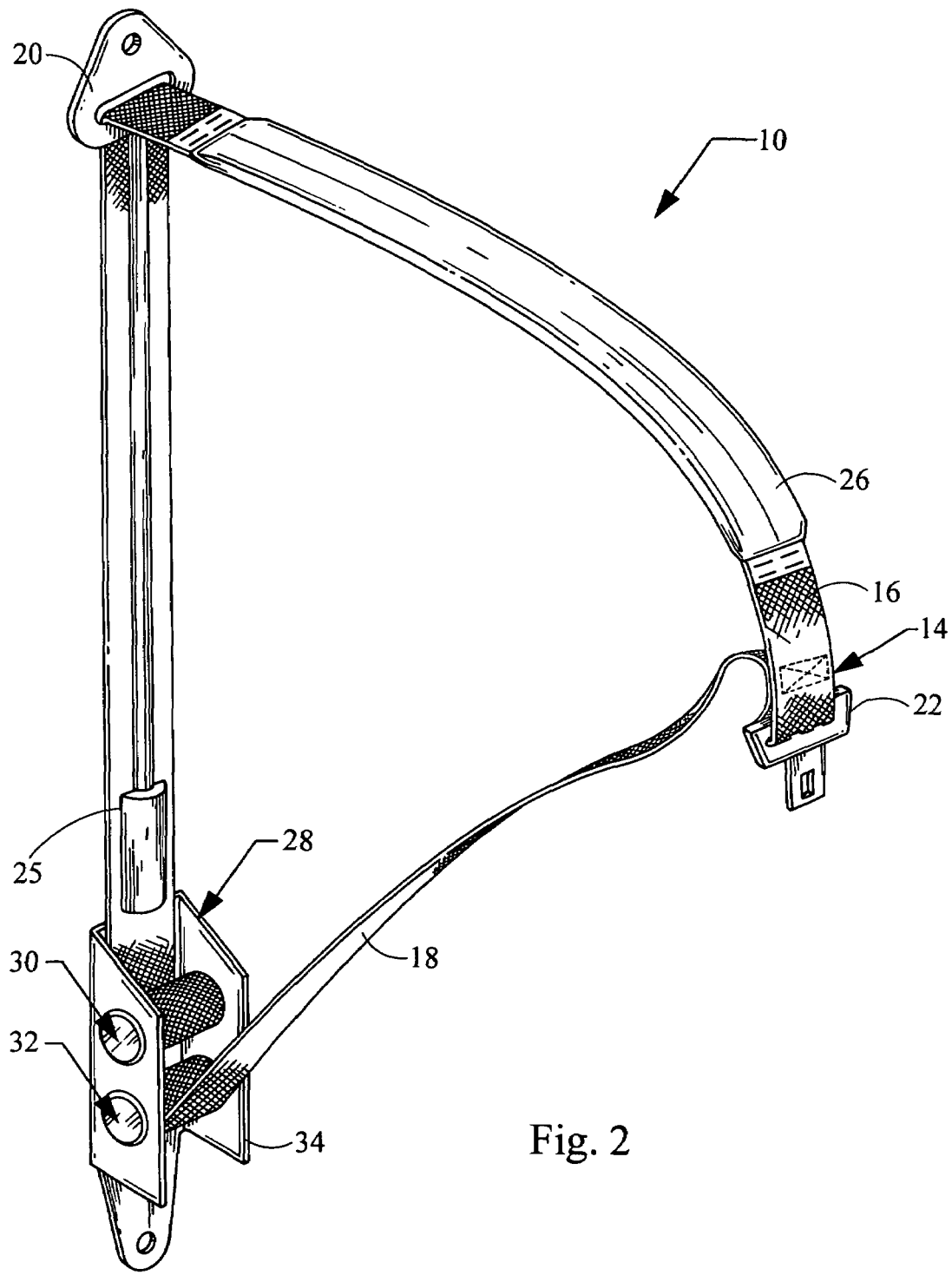
FIG. 2 is a diagrammatic view of a dual spool retractor assembly in accordance with the present invention illustrating additional components of the system.

Now with particular reference to FIG. 2, a diagrammatic view of the system of this invention is illustrated disassociated with the motor vehicle. This figure differs from FIG. 1 also in that it illustrates the same system, but on the front seat passenger side of the vehicle. FIG. 2 illustrates diagrammatically dual spool retractor assembly 28. Retractor assembly 28 is preferably mounted behind trim panels within the "B" pillar of the motor vehicle. Dual spool retractor assembly 28 includes a shoulder belt spool assembly 30 and a lap belt spool assembly 32, both mounted to a common retractor frame 34. Shoulder belt spool assembly 30 is connected with an stows the belt webbing of the shoulder belt 16, whereas the lap belt spool assembly 32 is engaged with and stores the lap belt 18 of the webbing. The vertically extending portion of shoulder belt 16 extending from shoulder belt spool assembly 30 and wrapping around D-ring 20 is preferably positioned behind a vehicle trim panel on the B-pillar. It is also possible to implement the present invention in a so-called integrated structural seat application in which the dual spool retractor assembly 28, D-ring 20, and the anchorage for buckle 24 are directly carried by the structure of seat 12.

Figure 3:
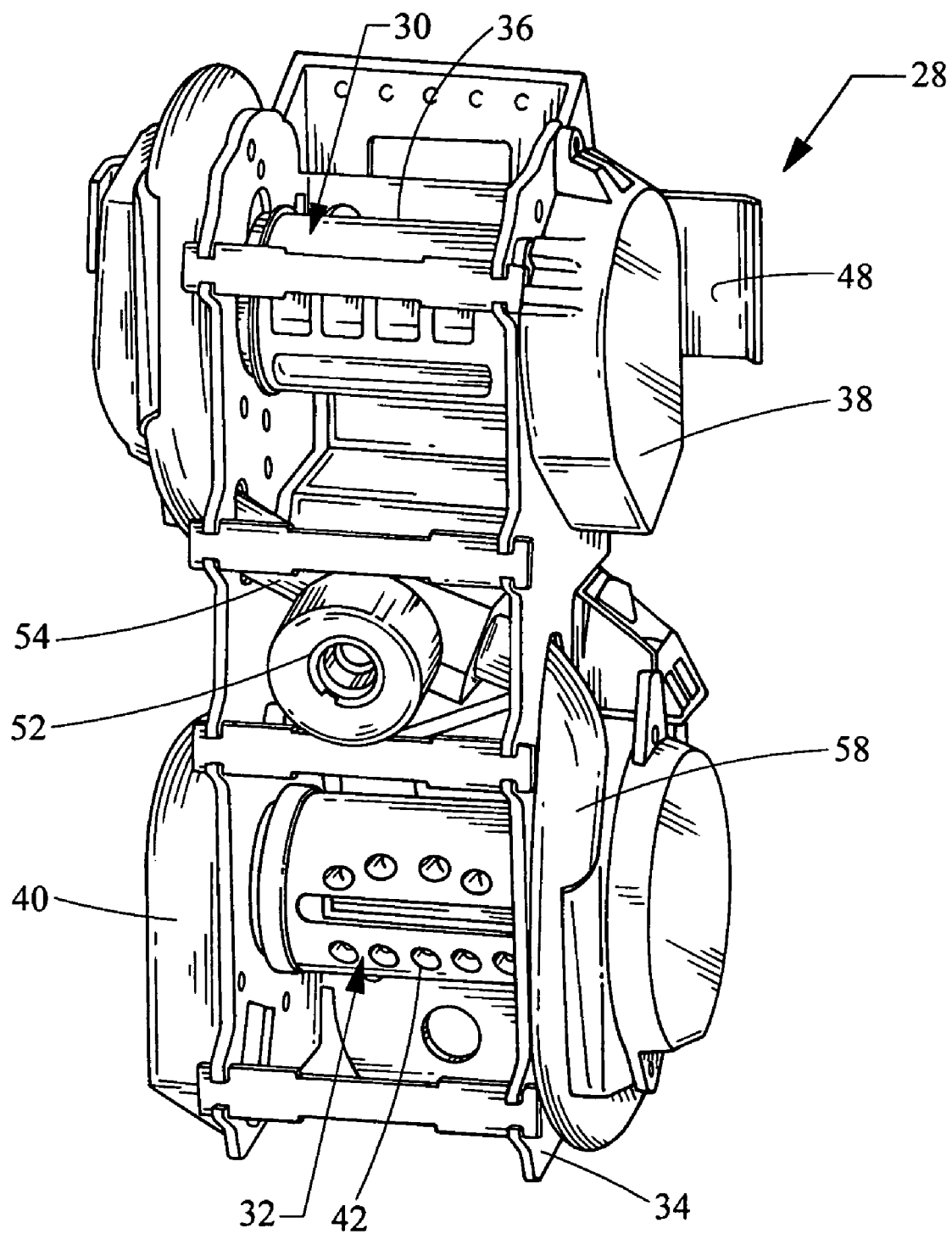
FIG. 3 is a pictorial view of a dual spool retractor assembly in accordance with this invention.
Figure 4:
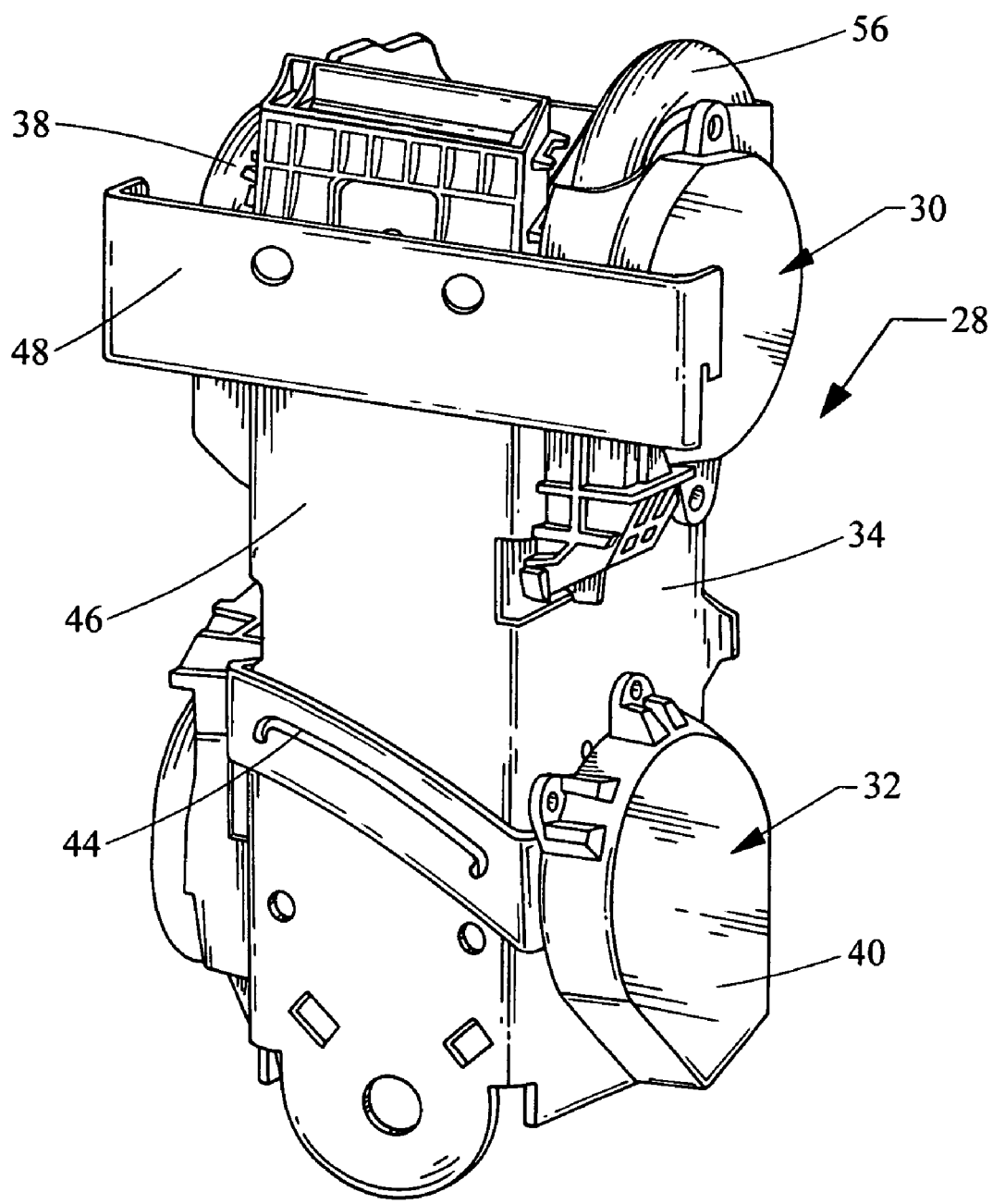
FIG. 4 is a pictorial view of the rear side of the dual spool retractor assembly in accordance with this invention.

Additional details of dual spool retractor assembly 28 are provided with reference to FIGS. 3 and 4. Shoulder belt spool assembly 30 includes shoulder belt spool 36 which engages the shoulder belt 16 webbing and rotates to wind-up or pay-out belt webbing. A torsional "clock" or "motor" type spring is carried within spring end cap 38 and rotationally biases the spool to retract the webbing. Similarly, end spring end cap 40 incorporates a torsional spring for biasing lap belt spool 42. Spool assemblies 30 and 32 may further incorporate other spool control mechanisms which are known in accordance with the prior art, including pretensioners, pre-pretensioners, inertia and webbing sensitive locking devices or other belt control devices. "Spool control systems" referred to in this specification describes any system which controls the rotational movement of a webbing spool, thus controlling the extraction and retraction of seat belt webbing. Spool locking devices typically incorporate an inertia sensitive element, such as a rolling ball or pendulum, and cause a sprocket of the spool to be engaged to prevent further withdrawing of webbing from spools 36 and 42. Webbing sensitive locking devices sense rapid pay-out of webbing to lock the retractor. Various electronic sensing mechanisms which detect the withdrawal of webbing and/or the connection of the tongue 22 to the buckle 24 may also be incorporated into dual spool retractor assembly 28. Both spool assemblies 30 and 32 are mounted to a common retractor frame 34.

FIG. 4 illustrates a slot 44 in the backplate 46 of frame 34 permitting passage of the lap belt 18. The shoulder belt 16 extends in the upward direction from shoulder belt spool assembly 36. Upper bracket 48 is used to lock and connect frame 34 to the sheet metal structure within the B-pillar of the vehicle (or another vehicle structural component). Due to this orientation of withdrawing webbing from spools 36 and 42, the spools rotate in opposite directions when both belt portions 16 and 18 are withdrawn from their respective spool assemblies.

Dual spool retractor assembly 28 further incorporates, in accordance with a principal feature of this invention, a spool control mechanism, shown as pretensioner system. As mentioned previously, a pretensioner is a device which winds seat belt webbing into a more taught condition against the occupant at the initial stages of a detected vehicle impact. This is provided to reduce forward motion or excursion of the occupant in response to the deceleration forces of a vehicle impact or rollover. The pretensioner system, best illustrated in FIG. 5 and designated by reference number 50, utilizes features known in accordance with the prior art. Pretensioner system 50 is similar to what is known as the assignees' "Roto-Pretensioner". The pretensioner system 50, however, differs in that it is directly coupled with both the shoulder belt and lap belt spool assemblies 30 and 32.

Figure 5:
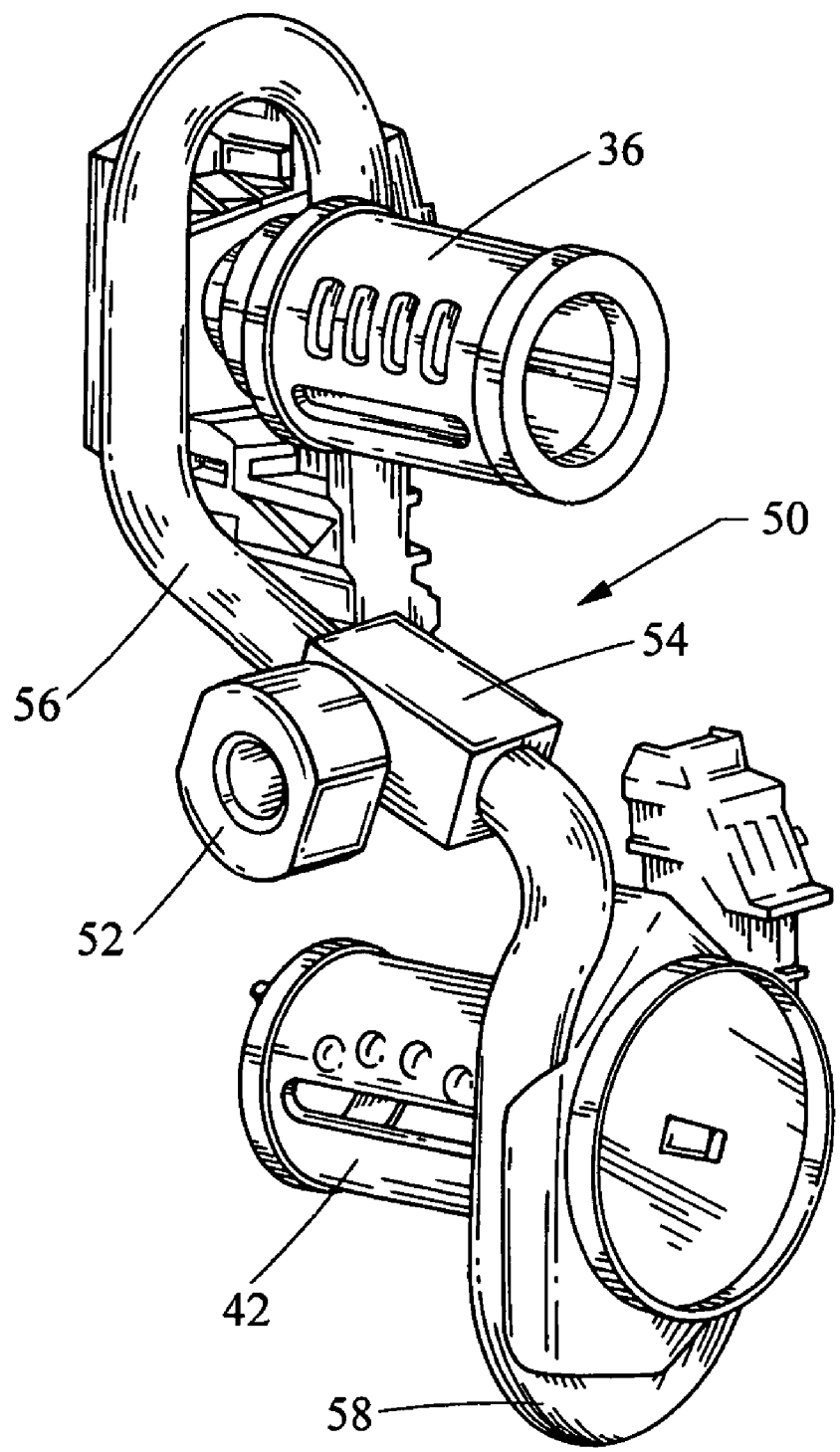
FIG. 5 is a cut-away pictorial view of the pretensioner assembly for the upper and lower spools of the dual spool retractor assembly in accordance with this invention.

With particular reference to FIG. 5, a micro gas generator 52 is used to provide expanding gas in response to a crash signal and is fired or deployed by electrical impulses. These impulses are generated by a vehicle restraint system controller which receives signals from vehicle crash sensors used to detect the occurrence of a vehicle impact. Gas generator 52 communicates with common gas generator connection 54 which in turn is coupled with an upper pretensioner tube and a lower pretensioner tube 58. The pretensioner subsystems acting on the shoulder belt spool and the lap belts spool are identical in configuration, except that they operate to rotate the spools 36 and 42 in opposite directions for pretensioning, for reasons mentioned previously.

Figure 6:
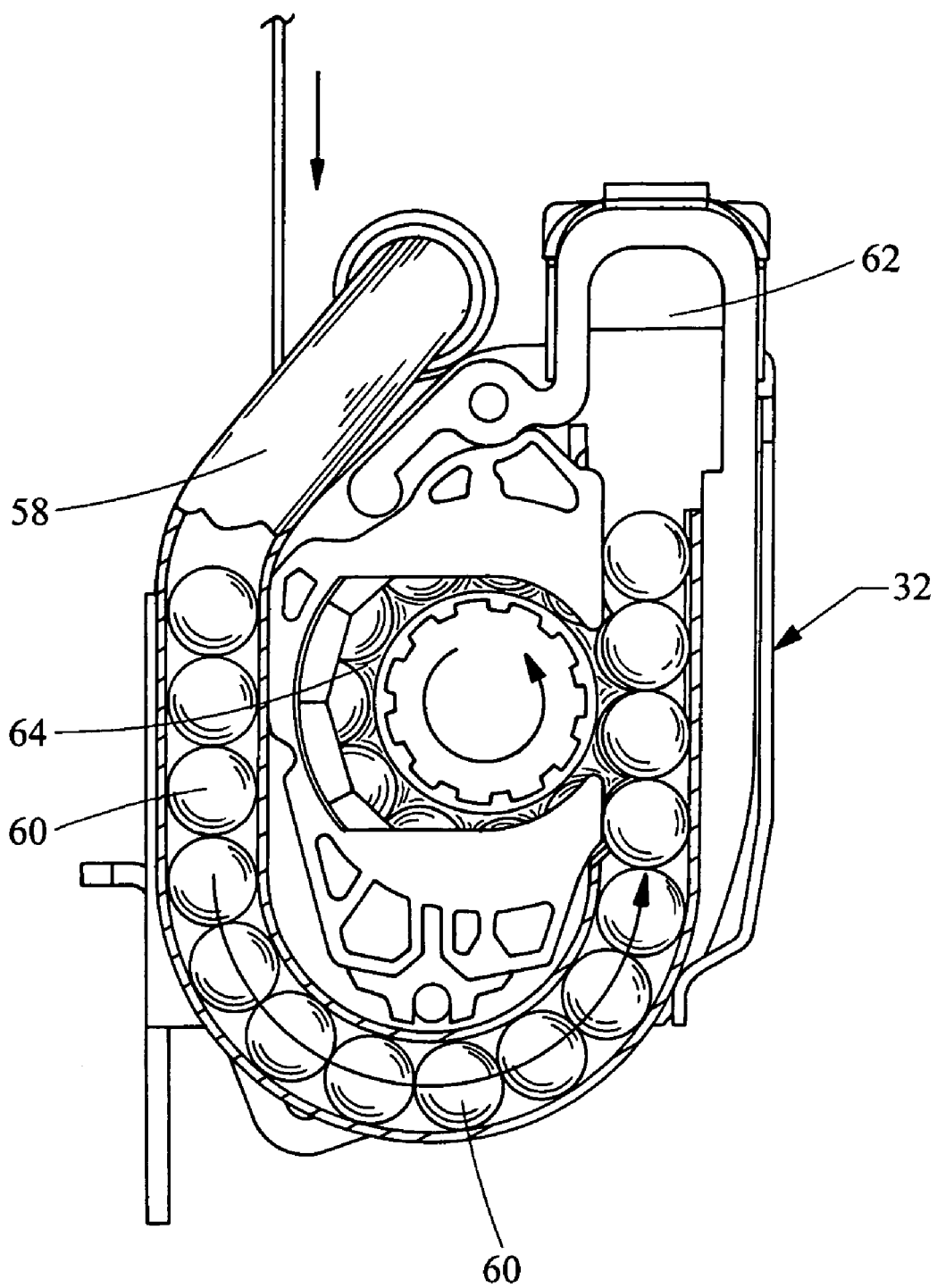
FIG. 6 is a cut-away view showing the operation of the upper spool assembly pretensioner assembly.

FIG. 6 provides a cut-away illustration of the operation of lower pretensioner tube 58 acting on the lap belt spool assembly 32. As shown in the cut-away illustration, lower pretensioner tube 58 includes a plurality of internally stored metal balls 60. These balls are initially maintained in a position generally as shown in FIG. 6. Upon the deployment of gas generator 52 to generate gas, balls 60 are forcibly driven toward ball trap 62 which forms the termination of pretensioner tube 56. As the balls 60 are driven through tube 56, they engage spool sprocket 64, much in the manner that a bicycle chain sprocket is engaged by a chain. The movement of balls 60 causes a predetermined number of degrees of angular rotation of spool 42 to occur which provides pretensioning. Once balls 60 fill ball trap 62, pretensioning winding of the spool does not continue. The system is designed to cause a predetermined angular movement of the spool to provide a degree of webbing retraction desired to satisfy occupant safety objectives. Upper pretensioner tube 56 is not illustrated in detail, but also incorporates internally stored balls 60 and operates in principle in a manner precisely as described above in connection with lap belt spool assembly 32.

Significant economies are provided in accordance with the dual spool retractor system and in accordance with this invention in that a single gas generator 52 is capable of providing the driving force for pretensioning of both spool assemblies 30 and 32. The integration of the upper and lower spool assemblies into a dual spool retractor 28 into a common frame allows this common control device to directly couple to both spools. The system 10 enables the use of a single vehicle firing loop, with all electrical connections in one place. This provides significant assembly by the OEM.

FIGS. 7 through 12 illustrate alternate embodiments of dual spool retractor assemblies in accordance with the principles of the present invention. Elements having features common with those previously described are identified by like reference number without a repetition of their description.

Figure 7:
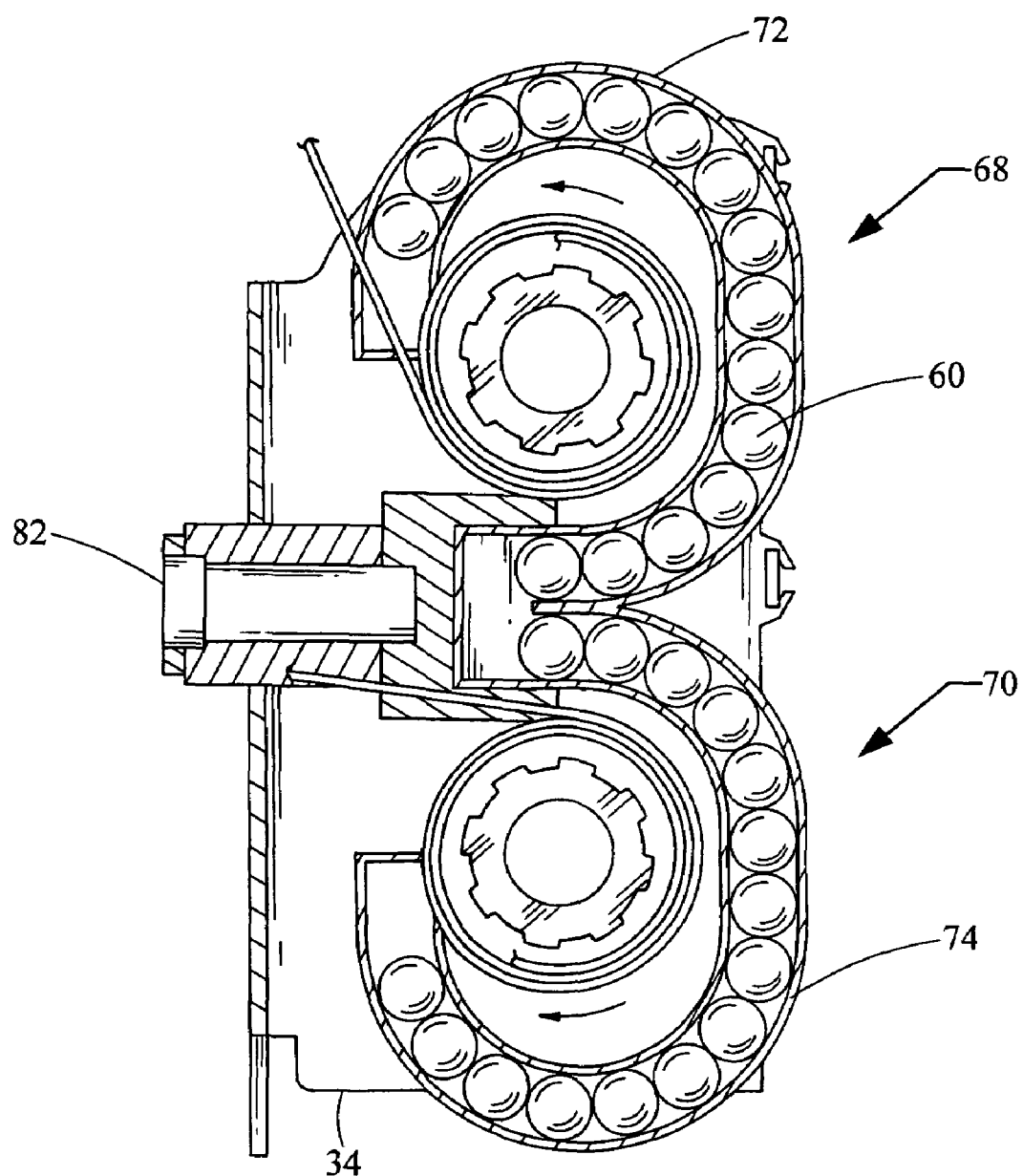
FIG. 7 is a diagrammatic side view of a dual spool retractor system in accordance with a second embodiment of this invention utilizing a Roto-Pretensioner system.

With reference to FIG. 7, a dual spool retractor in accordance with a second embodiment of the present invention is illustrated in diagrammatic manner. Dual spool retractor assembly 68 is similar to retractor assembly 28 previously described and incorporates a Roto-Pretensioner system, in this case designated by reference number 70. The configuration of upper pretension tube 72 and lower pretensioner tube 74 differs from that of the prior embodiment. In the case of retractor assembly 28, the Roto-Pretensioner tubes engage opposed ends of the spool assemblies. In this instance, however, both upper and lower pretensioner tubes 72 and 74 extend from common gas generator connection 76 and wrap around the lap belt spool assembly 78 and shoulder belt spool assembly 80. As in the case of the prior embodiments, pretensioner system 70 incorporates balls 60 within the pretensioner tubes 72 and 74 and engage with spool sprockets (not shown) associated with each of the spool assemblies. Like the prior embodiment, dual spool retractor assembly 68 incorporates a single micro gas generator 82 which provides pretensioning for both spool assemblies. Also like the prior embodiment, both spool assemblies 78 and 80 are pretensioned by rotating them in opposite rotational directions. The configuration of dual spool retractor assembly 68 might be chosen over retractor assembly 28 to satisfy packaging requirements for the final assembled unit or for assembly efficiencies.

Figure 8:
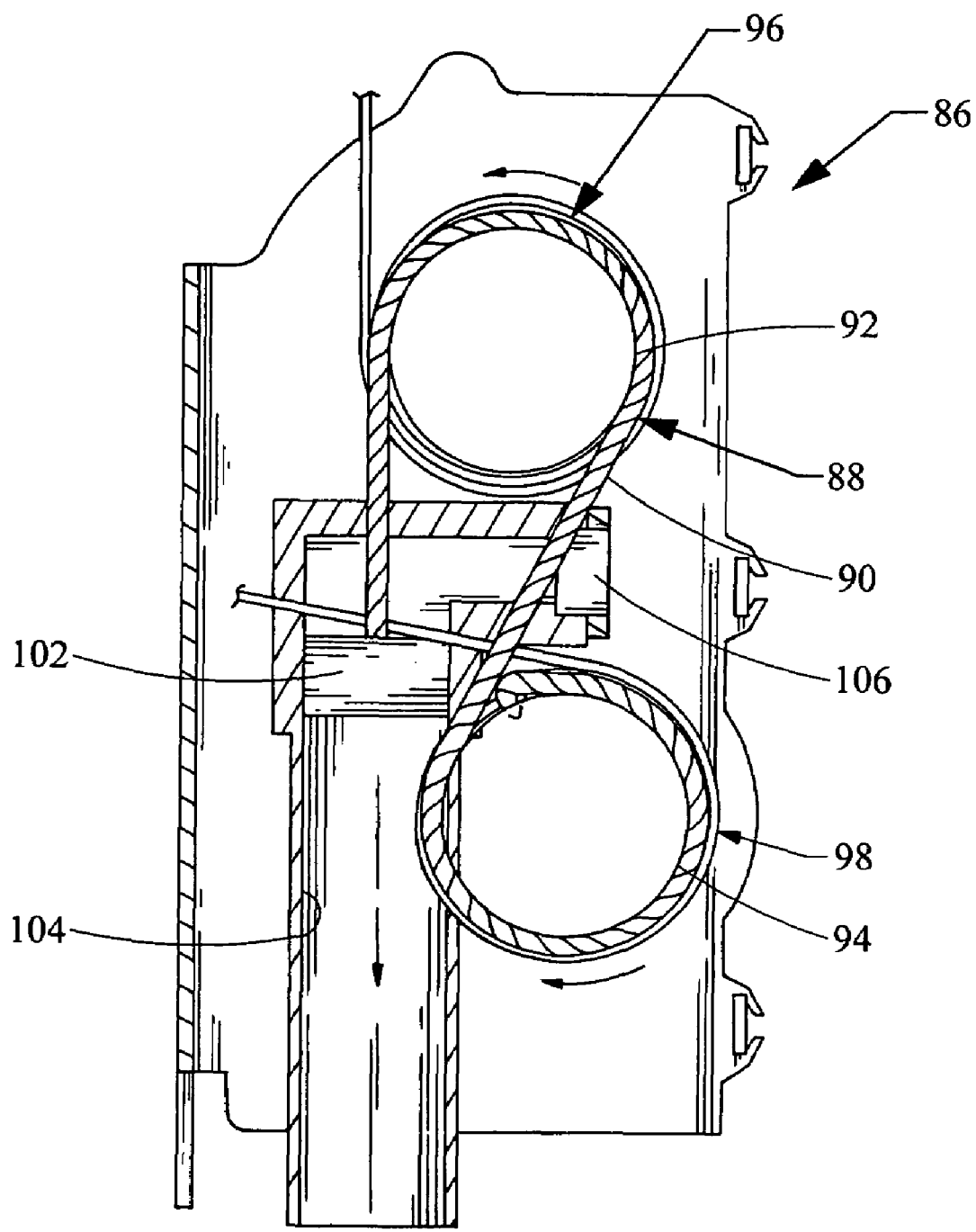
FIG. 8 is a side diagrammatic view of a dual spool retractor system in accordance with a third embodiment of this invention utilizing a cable driven pretensioner system.

FIG. 8 illustrates diagrammatically a dual spool retractor assembly 86 in accordance with a third embodiment of the present invention. For this embodiment, an alternate type of pretensioner assembly 88 is provided. In this instance, pretensioner assembly 88 incorporates a wound cable 90 which wraps around pulleys 92 and 94 which engage with shoulder belt spool assembly 96 and lap belt spool assembly 98 respectively. Cable 90 is connected with plunger 102 which fits within cylinder 104. A micro gas generator 106 generates gas upon receiving an appropriate firing signal and the increase in pressure within cylinder 104 forces plunger 102 to stroke to bottom out in the cylinder. This process pulls on cable 90 which, through its interaction with pulleys 92 and 94, causes pretensioning rotation of both spool assemblies 96 and 98. As in the previous embodiments, retractor assembly 86 causes pretensioning rotation for the spool assemblies to occur in opposite rotational directions.

The next series of embodiments of the present invention utilize a rack and pinion or gear pinion type pretensioner assembly. Each of these embodiments utilize a pair of pinion gears 110 and 112 engaged with upper and lower spool assemblies 114 and 116, respectively.

Figure 9:
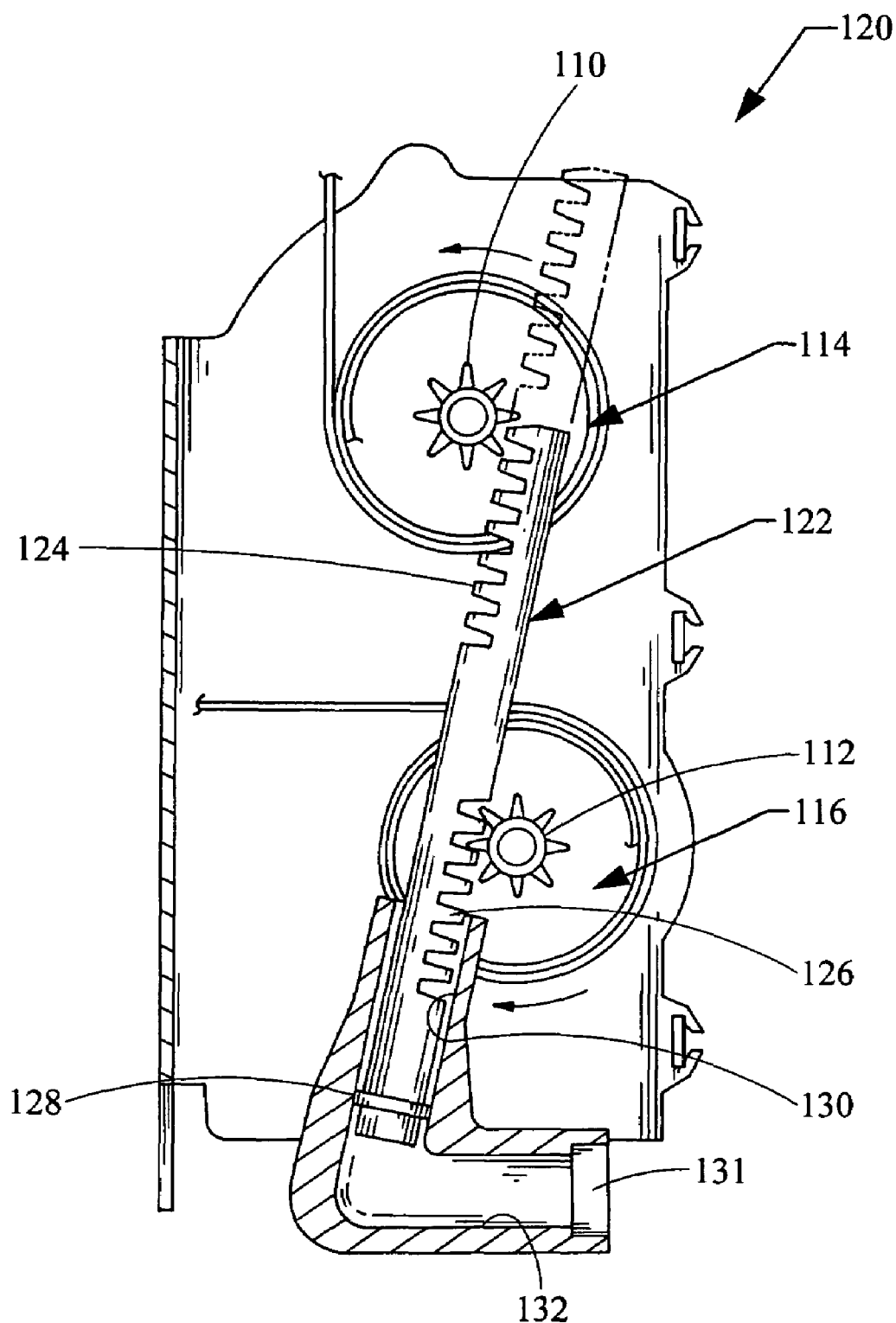
FIG. 9 is a side diagrammatic view of a dual spool retractor system in accordance with a fourth embodiment of this invention utilizing a rack and pinion pretensioner assembly having a rack with teeth on opposed side surfaces.

In retractor assembly 120 shown in FIG. 9, toothed rack 122 features rows of teeth 124 and 126 on opposite surfaces of the rack, each engaging respective pinion gears 110 and 112. The end of toothed rack 122 features plunger 128 which fits within cylinder 130. The gas generator 131 provides gas within chamber 132 and causes toothed rack 122 to stroke in an upward direction, thus causing rotation of pinion gears 110 and 112. This causes rotation of spool assemblies 114 and 116 in opposite rotational directions during pretensioning motion.

Figure 10:
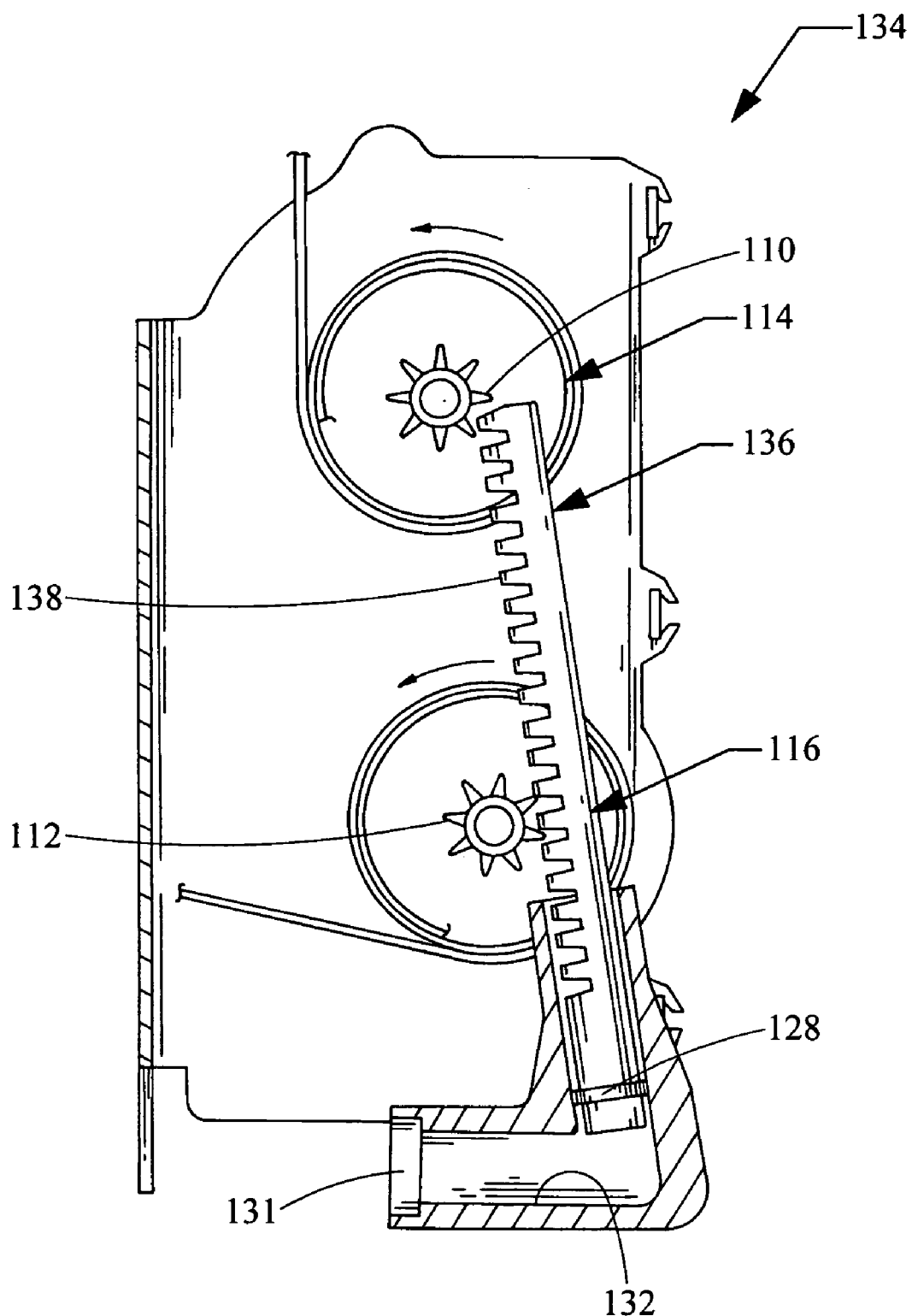
FIG. 10 is a side diagrammatic view of a dual spool retractor system in accordance with a fifth embodiment of this invention illustrating a rack and pinion type pretensioner having a single toothed rack surface engaging both spool pinion gears.

FIG. 10 illustrates dual spool retractor assembly 134 utilizing toothed rack 136 having a row of teeth 138 on one surface only engaging pinion gears 110 and 112. Retractor assembly 134 operates in a manner similar to that of retractor assembly 120 except that stroking motion of toothed rack 136 causes rotation of both spool assemblies 114 and 116 in the same rotational direction.

Figure 11:
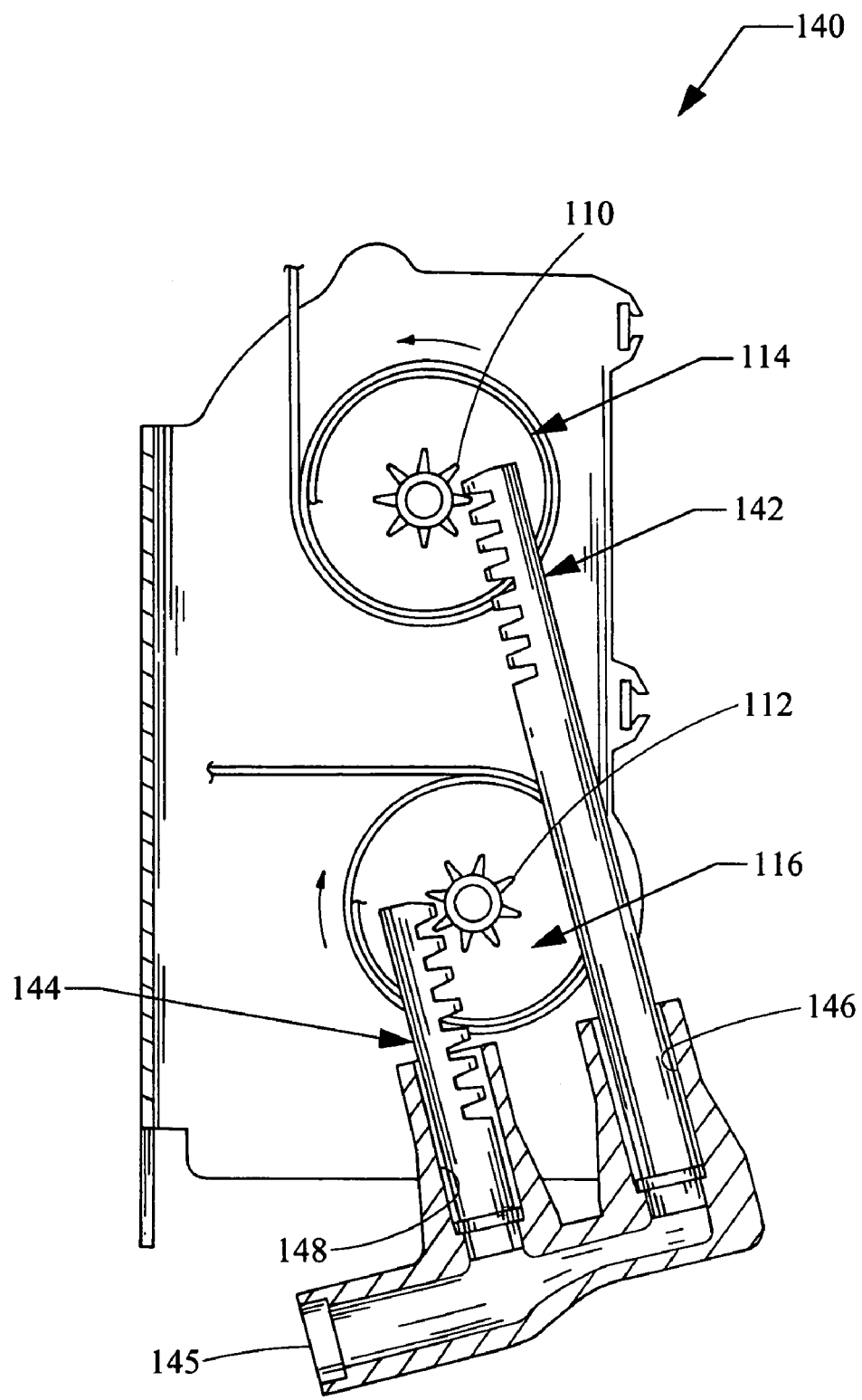
FIG. 11 is a side diagrammatic view of a dual spool retractor system in accordance with a sixth embodiment of this invention illustrating a pair of separate but commonly actuated rack and pinion racks engaged with retractor spool pinions.

FIG. 11 illustrates dual spool retractor assembly 140. In this case a pair of separate toothed racks 142 and 144 are employed, each fitting within their respective cylinders 146 and 148. Toothed racks 142 and 144 separately engage pinion gears 110 and 112 respectively, and each is actuated to move in response to gas produced by gas generator 145. The configuration of retractor assembly 140 provides rotation of spool assemblies 114 and 116 in opposite rotational directions. The primary advantage of the design of retractor assembly 140 is that if one of the spool assemblies were to bind, the other spool may undergo pretensioning rotation. Thus in the configuration shown in FIG. 11, if one of spool assemblies 114 or 116 was bound and could not rotate, the other spool assembly would still undergo pretensioning rotation since toothed racks 142 and 144 act separately and are driven by separate chambers.

Figure 12:
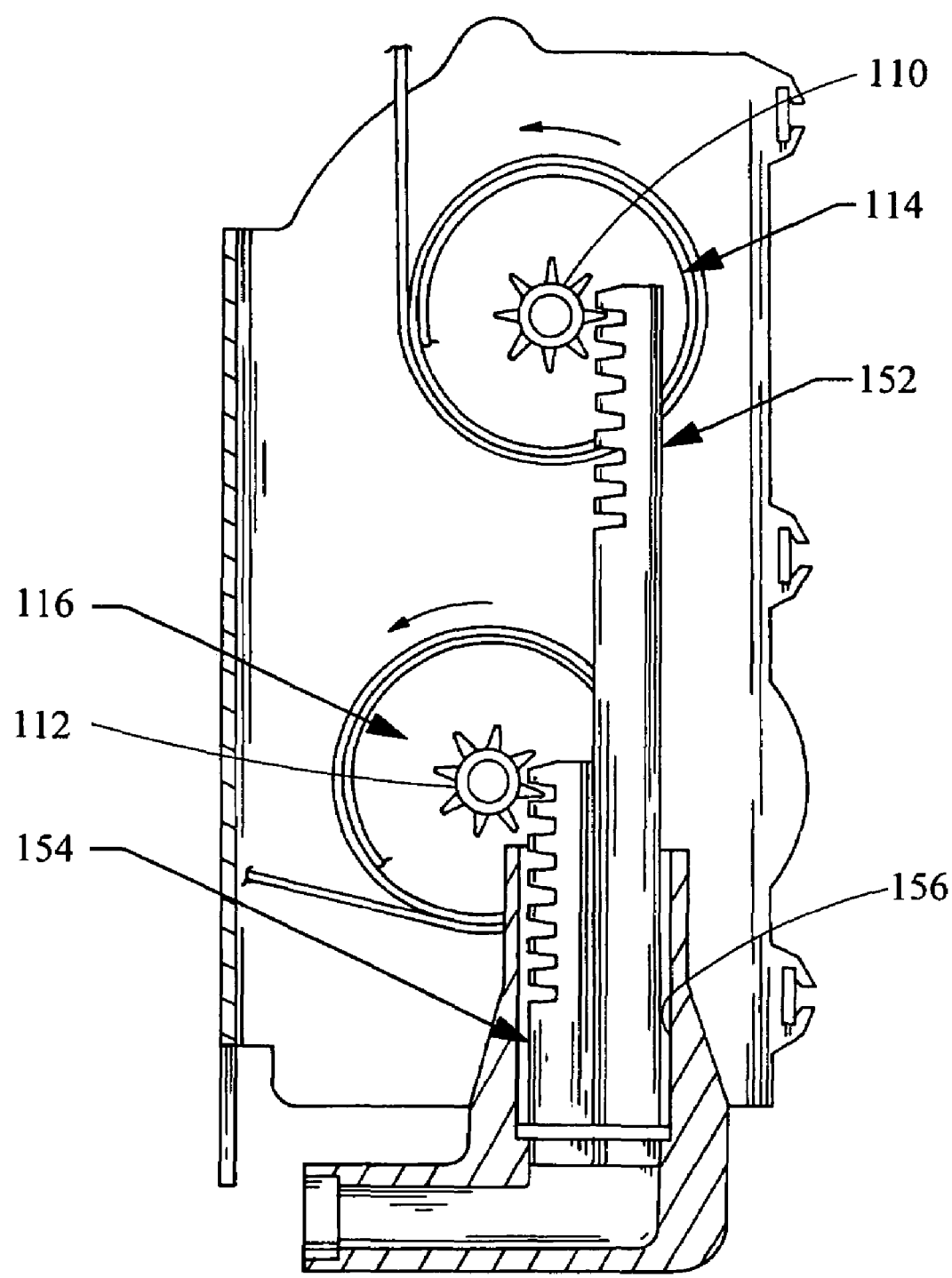
FIG. 12 is a side diagrammatic view of a seventh embodiment of a dual spool retractor system in accordance with this invention illustrating a rack and pinion type pretensioner having rack surface formed on two displaced but parallel surfaces of a drive rack.

FIG. 12 illustrates dual spool retractor assembly 150. In this instance, a pair of toothed racks 152 and 154 are provided that fit closely against one another and both form plungers which fit within a common cylinder 156. Since the toothed racks 152 and 154 can slide relative to each other, they act independently and thus one can cause pretensioning rotation while the other is bound or is unable to move its respective spool assembly.

While the above description constitutes the preferred embodiment of the present invention, it will be appreciated that the invention is susceptible to modification, variation, and change without departing from the proper scope and fair meaning of the accompanying claims.

The invention claimed is:

1. A seat belt retractor assembly for a motor vehicle occupant restraint system of the type having a shoulder belt, a lap belt, and a latch plate between the shoulder belt and the lap belt engageable with a buckle, the assembly comprising:
   a retractor frame adapted to be mounted to the motor vehicle,
   a shoulder belt spool assembly affixed to the frame and connected with the shoulder belt and having a rotatable shoulder belt spool with the shoulder belt wound on the shoulder belt spool for stowing and paying out the shoulder belt,
   a lap belt spool assembly affixed to the frame and connected with the lap belt and having a rotatable lap belt spool with the lap belt wound on the lap belt spool for stowing and paying out the lap belt, and
   a pretensioner system having a single gas source communicating with a shoulder belt spool pretensioner and a lap belt spool pretensioner, the shoulder belt spool pretensioner coupled to the shoulder belt spool assembly and the lap belt spool pretensioner coupled to the lap belt spool assembly, the shoulder belt spool pretensioner includes a shoulder belt pretensioner tube which conducts gas from the gas source wherein gas flowing in the shoulder belt pretensioner tube causes rotation of the shoulder belt spool for pretensioning the shoulder belt, and the lap belt spool pretensioner includes a lap belt spool pretensioner tube which conducts gas from the gas source wherein gas flowing in the lap belt pretensioner tube causes rotation of the lap belt spool for pretensioning the lap belt.

2. A seat belt retractor assembly in accordance with claim 1 further comprising a first plurality of balls positioned in the shoulder belt pretensioner tube which are forced to move in the shoulder belt pretensioner tube in response to the gas from the gas source to engage with a shoulder belt spool pretensioner sprocket to cause rotation of the shoulder belt spool for winding the shoulder belt spool and pretensioning the shoulder belt.

3. A seat belt retractor assembly in accordance with claim 1 further comprising a second plurality of balls positioned in the lap belt pretensioner tube which are forced to move in the lap belt pretensioner tube in response to the gas from the gas source to engage with a lap belt pretensioner sprocket to cause rotation of the lap belt spool for winding the lap belt spool and pretensioning the lap belt.

4. A seat belt retractor assembly in accordance with claim 1 wherein the shoulder belt further includes an inflatable belt section.

5. A seat belt retractor assembly in accordance with claim 1 wherein the seat belt retractor assembly is adapted to be mounted to a "B" pillar of the motor vehicle.

6. A seat belt retractor assembly in accordance with claim 1 wherein the retractor frame forms a slit through which the lap belt passes.

7. A seat belt retractor assembly in accordance with claim 1 wherein the shoulder belt spool assembly is affixed to the frame above the lap belt spool assembly.

8. A seat belt retractor assembly in accordance with claim 1 further comprising the gas source communicates with a common gas connection which communicates with both the shoulder belt pretensioner tube and the lap belt pretensioner tube.

9. A seat belt retractor assembly for a motor vehicle occupant restraint system of the type having a shoulder belt, a lap belt, and a latch plate between the shoulder and lap belts engageable with a buckle, the assembly comprising:
   a retractor frame adapted to be mounted to the motor vehicle,
   a shoulder belt spool assembly affixed to the frame and connected with the shoulder belt and having a rotatable shoulder belt spool with the shoulder belt wound on the shoulder belt spool for stowing and paying out the shoulder belt,
   a lap belt spool assembly affixed to the frame and connected with the lap belt and having a rotatable lap belt spool with the lap belt wound on the lap belt spool for stowing and paying out the lap belt, and
   a pretensioner unit having a single gas source communicating with and supplying gas to a shoulder belt pretensioner tube and a lap belt pretensioner tube, a first plurality of balls positioned in the shoulder belt pretensioner tube which are forced to move in the shoulder belt pretensioner tube in response to the gas from the gas source to engage with a shoulder belt spool pretensioner sprocket to cause rotation of the shoulder belt spool for winding the shoulder belt spool and pretensioning the shoulder belt, and a second plurality of balls positioned in the lap belt pretensioner tube which are forced to move in the lap belt pretensioner tube in response to the gas from the gas source to engage with a lap belt pretensioner sprocket to cause rotation of the lap belt spool for winding the lap belt spool and pretensioning the lap belt.

10. A seat belt retractor assembly in accordance with claim 9 wherein the shoulder belt further includes an inflatable belt section.

11. A seat belt retractor assembly in accordance with claim 9 wherein the seat belt retractor assembly is adapted to be mounted to a "B" pillar of the motor vehicle.

12. A seat belt retractor assembly in accordance with claim 9 wherein the retractor frame forms a slit through which the lower lap belt passes.

13. A seat belt retractor assembly in accordance with claim 9 wherein the shoulder belt spool assembly is affixed to the frame above the lap belt spool assembly.

14. A seat belt retractor assembly in accordance with claim 9 further comprising the gas source communicates with a common gas connection which communicates with both the shoulder belt pretensioner tube and the lap belt pretensioner tube.

\* \* \* \* \*

UNITED STATES PATENT AND TRADEMARK OFFICE
CERTIFICATE OF CORRECTION

PATENT NO. : 7,401,815 B2  Page 1 of 1
APPLICATION NO. : 11/082567
DATED : July 22, 2008
INVENTOR(S) : Gunter K. Clute It is certified that error appears in the above-identified patent and that said Letters Patent is hereby corrected as shown below:

On the title page item (73), delete "Antoliv" and replace with -- Autoliv --.

Signed and Sealed this

Sixth Day of January, 2009

JON W. DUDAS
*Director of the United States Patent and Trademark Office*